United States Patent
Kang

(10) Patent No.: US 10,056,966 B2
(45) Date of Patent: Aug. 21, 2018

(54) INTERFERENCE CANCELLATION REPEATER AND REPEATING METHOD

(71) Applicant: Advanced RF Technologies, Inc., Burbank, CA (US)

(72) Inventor: Tae-Gil Kang, Seoul (KR)

(73) Assignee: Advanced RF Technologies, Inc., Burbank, CA (US)

( * ) Notice: Subject to any disclaimer, the term of this patent is extended or adjusted under 35 U.S.C. 154(b) by 0 days.

(21) Appl. No.: 14/449,110

(22) Filed: Jul. 31, 2014

(65) Prior Publication Data

US 2015/0038071 A1   Feb. 5, 2015

(30) Foreign Application Priority Data

Jul. 31, 2013   (KR) .................. 10-2013-0090562

(51) Int. Cl.
  *H04W 4/00*   (2009.01)
  *H04B 7/155*   (2006.01)

(52) U.S. Cl.
  CPC ............................... *H04B 7/15585* (2013.01)

(58) Field of Classification Search
  CPC ..... H04B 7/0417; H04B 7/15585; H04B 7/14
  USPC ........................ 455/7, 11.1, 13.1, 435.1
  See application file for complete search history.

(56) References Cited

U.S. PATENT DOCUMENTS

| | | | |
|---|---|---|---|
| 4,383,331 A | 5/1983 | Davidson | |
| 4,776,032 A | 10/1988 | Odate et al. | |
| 5,095,528 A | 3/1992 | Leslie et al. | |
| 2002/0085647 A1 | 7/2002 | Oishi et al. | |
| 2006/0264174 A1 | 11/2006 | Moss | |
| 2010/0285733 A1 | 11/2010 | Gore et al. | |
| 2010/0285736 A1 | 11/2010 | Gore et al. | |

(Continued)

FOREIGN PATENT DOCUMENTS

| | | |
|---|---|---|
| KR | 1020000112629 A | 12/2008 |
| KR | 1020080104560 A | 12/2008 |

(Continued)

OTHER PUBLICATIONS

Non-Final Office action for U.S. Appl. No. 13/841,447, dated Jan. 5, 2015, 13 pages.

(Continued)

*Primary Examiner* — Tu X Nguyen
(74) *Attorney, Agent, or Firm* — Lewis Roca Rothgerber Christie LLP

(57) ABSTRACT

Disclosed herein an interference cancellation repeater and repeating method. The interference cancellation repeater includes a reception unit, an analog-to-digital (AD) converter unit, a digital processing unit, a digital-to-analog (DA) converter unit, and a transmission unit. The reception unit receives an analog signal. The AD converter unit converts the analog signal into a digital signal. The digital processing unit determines whether a feedback signal is present by analyzing the correlation between the digital signal and a previous transmission signal, and performs an operation of cancelling the feedback signal if, as a result of the determination, it is determined that the feedback signal is present. The DA converter unit converts a signal output from the digital processing unit into a transmission analog signal. The transmission unit sends the transmission analog signal.

14 Claims, 2 Drawing Sheets

(56) References Cited

U.S. PATENT DOCUMENTS

2014/0194054 A1* 7/2014 Kim .................. H04B 7/15
                                              455/11.1

FOREIGN PATENT DOCUMENTS

KR          101090766 B1    12/2011
KR       1020120122475 A    11/2012

OTHER PUBLICATIONS

Final Office action for U.S. Appl. No. 13/841,447, dated Sep. 18, 2015, 10 pages.
Non-Final Office action for U.S. Appl. No. 13/841,447, dated Mar. 25, 2016, 11 pages.

* cited by examiner

INTERFERENCE CANCELLATION REPEATER AND REPEATING METHOD

CROSS REFERENCE TO RELATED APPLICATIONS

This application claims the priority of Korean Patent Application No. 10-2013-0090562, filed on Jul. 31, 2013, which is hereby incorporated by reference in its entirety into this application.

BACKGROUND OF THE INVENTION

1. Technical Field

The present invention relates generally to an interference cancellation repeater and repeating method and, more particularly, to an interference cancellation repeater and repeating method that are capable of more precisely cancelling a feedback signal without distorting a signal.

2. Description of the Related Art

In a mobile communication system, repeaters are installed in order to cover radio wave shadow areas. In the case of a repeater having no interference cancellation function among such repeaters, if signals of input and output antennas are not isolated from each other, the signal output from the output antenna of the repeater is input to the input antenna of the repeater again, thus resulting in an oscillation phenomenon attributable to the feedback signal. As a result, signals cannot be smoothly served, which may have an adverse effect on products. For this reason, in the case of a repeater installed in an environment in which an oscillation phenomenon is generated, the repeater outputs signals of reduced output intensity, which generates another shadow area.

In order to overcome such a problem, an Interference Cancellation System (ICS) repeater was proposed. The ICS repeater cancels a feedback signal through digital signal processing. However, a conventional ICS repeater is problematic in that the time it takes for a repeater system to process a signal is increased by the performance of an unnecessary processing task for cancelling a signal determined to be an interference signal from an input signal even when there is no interference signal and in that a repeated signal is influenced by a noise signal because noise is generated in an empty frequency domain.

In relation to the ICS repeater, Korean Patent No. 0879334 discloses "Micro Integrated Wireless Interference Cancellation Repeater and Method thereof."

SUMMARY OF THE INVENTION

Accordingly, the present invention has been made keeping in mind the above problems occurring in the prior art, and an object of the present invention is to more precisely cancel a feedback signal generated due to an insufficient distance between antennas through digital signal processing, thereby preventing the oscillation of a mobile communication repeater.

Another object of the present invention is to implement interference cancellation repeating technology that requires a relatively small number of resources.

Yet another object of the present invention is to perform control so that an interference cancellation operation is not performed if a feedback signal is not present, thereby implementing interference cancellation repeating technology having no distorted signal.

In accordance with an aspect of the present invention, there is provided an interference cancellation repeater, including a reception unit configured to receive an analog signal; an analog-to-digital (AD) converter unit configured to convert the analog signal into a digital signal; a digital processing unit configured to determine whether a feedback signal is present by analyzing the correlation between the digital signal and a previous transmission signal, and to perform an operation of cancelling the feedback signal if, as a result of the determination, it is determined that the feedback signal is present; a digital-to-analog (DA) converter unit configured to convert a signal output from the digital processing unit into a transmission analog signal; and a transmission unit configured to send the transmission analog signal.

The digital processing unit may include an input unit configured to receive the digital signal from the AD converter unit; a buffer unit configured to store information about the previous transmission signal that is a signal transmitted by the transmission unit before the analog signal; a correlation checking unit configured to periodically check whether the previous transmission signal is included in the digital signal as the feedback signal by analyzing the correlation between the digital signal received from the input unit and the previous transmission signal stored in the buffer unit; a control unit configured to control the operation of cancelling the feedback signal from the digital signal so that the operation is performed if, as a result of the check of the correlation checking unit, the feedback signal is determined to be included in the digital signal; a delay unit configured to, under the control of the control unit, apply a specific delay time to the previous transmission signal; an adaptive filter unit configured to, under the control of the control unit, filter the previous transmission signal to which the specific delay time has been applied by the delay unit, output the filtered previous transmission signal, and update the coefficient of a filter in order to cancel the feedback signal; and an interference cancellation unit configured to cancel the feedback signal from the digital signal using the previous transmission signal filtered and output by the adaptive filter unit.

The correlation checking unit may determine that the previous transmission signal is included in the digital signal as the feedback signal if the similarity between a signal included in the digital signal and the previous transmission signal exceeds a predetermined reference value or a probability calculation value.

The adaptive filter unit may include a plurality of adaptive filters; the delay unit may include a plurality of delay units having different delay time ranges; and the control unit may select a specific adaptive filter and a specific delay unit from among the plurality of adaptive filters and the plurality of delay units based on the analyzed correlation, and may extract the feedback signal using the specific adaptive filter and the specific delay unit.

The interference cancellation repeater may further include a Radio Frequency (RF) down-converter unit configured to down-convert the analog signal received from the reception unit into a signal in an intermediate frequency band; and an RF up-converter unit configured to up-convert the transmission analog signal received from the DA converter unit into a signal in an RF band.

The correlation checking unit may not analyze the correlation between the digital signal and the previous transmission signal from a point of time at which the previous transmission signal is stored in the buffer unit until a total delay time that is a sum of a first delay time it takes for a signal to pass through the reception unit, the RF down-converter unit and the AD converter unit, and a second delay time it takes for a signal to pass through the DA converter unit, the RF up-converter unit and the transmission unit elapses; and the correlation checking unit may analyze the correlation between the digital signal and the previous transmission signal after the total delay time has elapsed from the point of time at which the previous transmission signal is stored in the buffer unit.

The interference cancellation repeater may further include a band-pass filter configured to receive the digital signal from which the feedback signal has been canceled by the interference cancellation unit, and to extract a signal in a preset necessary band from the received digital signal.

The interference cancellation repeater may further include a band-pass filter configured to receive the digital signal from the input unit, to extract a signal in a preset necessary band from the receiving digital signal, and to transfer the signal in the preset necessary band to the interference cancellation unit.

In accordance with an aspect of the present invention, there is provided an interference cancellation repeating method, including receiving, by a reception unit, an analog signal; converting, by an AD converter unit, the analog signal into a digital signal; determining, by a digital processing unit, whether a feedback signal is present by analyzing the correlation between the digital signal and a previous transmission signal, and performing, by the digital processing unit, an operation of cancelling the feedback signal if, as a result of the determination, it is determined that the feedback signal is present; converting, by a DA converter unit, a signal output from the digital processing unit into a transmission analog signal; and sending, by a transmission unit, the transmission analog signal.

Performing the operation of cancelling the feedback signal may include receiving, by an input unit, the digital signal from the AD converter unit; storing, by a buffer unit, information about the previous transmission signal transmitted by the transmission unit before the analog signal; checking, by a correlation checking unit, whether the previous transmission signal stored in the buffer unit is included in the digital signal received from the input unit as the feedback signal by periodically analyzing the correlation between the digital signal and the previous transmission signal; controlling, by a control unit, the operation of cancelling the feedback signal from the digital signal so that the operation is performed if, as a result of the check, the feedback signal is determined to be included in the digital signal; applying, by a delay unit, a specific delay time to the previous transmission signal; filtering, by an adaptive filter unit having a coefficient updated in order to cancel a feedback signal, the previous transmission signal to which the specific delay time has been applied, and outputting, by an adaptive filter unit, the filtered previous transmission signal; and canceling, by an interference cancellation unit, the feedback signal from the digital signal using the filtered and output previous transmission signal.

The interference cancellation repeating method may further include down-converting, by an RE down-converter unit, the analog signal received from the reception unit into a signal in an intermediate frequency band; and up-converting, by an RF up-converter unit, the transmission analog signal received from the DA converter unit into a signal in an RF band.

Checking whether the previous transmission signal is included in the digital signal may include not analyzing the correlation between the digital signal and the previous transmission signal until a total delay time that is a sum of a first delay time it takes for a signal to pass through the reception unit, the RF down-converter unit and the AD converter unit and a second delay time it takes for a signal to pass through the DA converter unit, the RF up-converter unit and the transmission unit elapses; and analyzing the correlation between the digital signal and the previous transmission signal after the total delay time has elapsed from a point of time at which the previous transmission signal is stored in the buffer unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
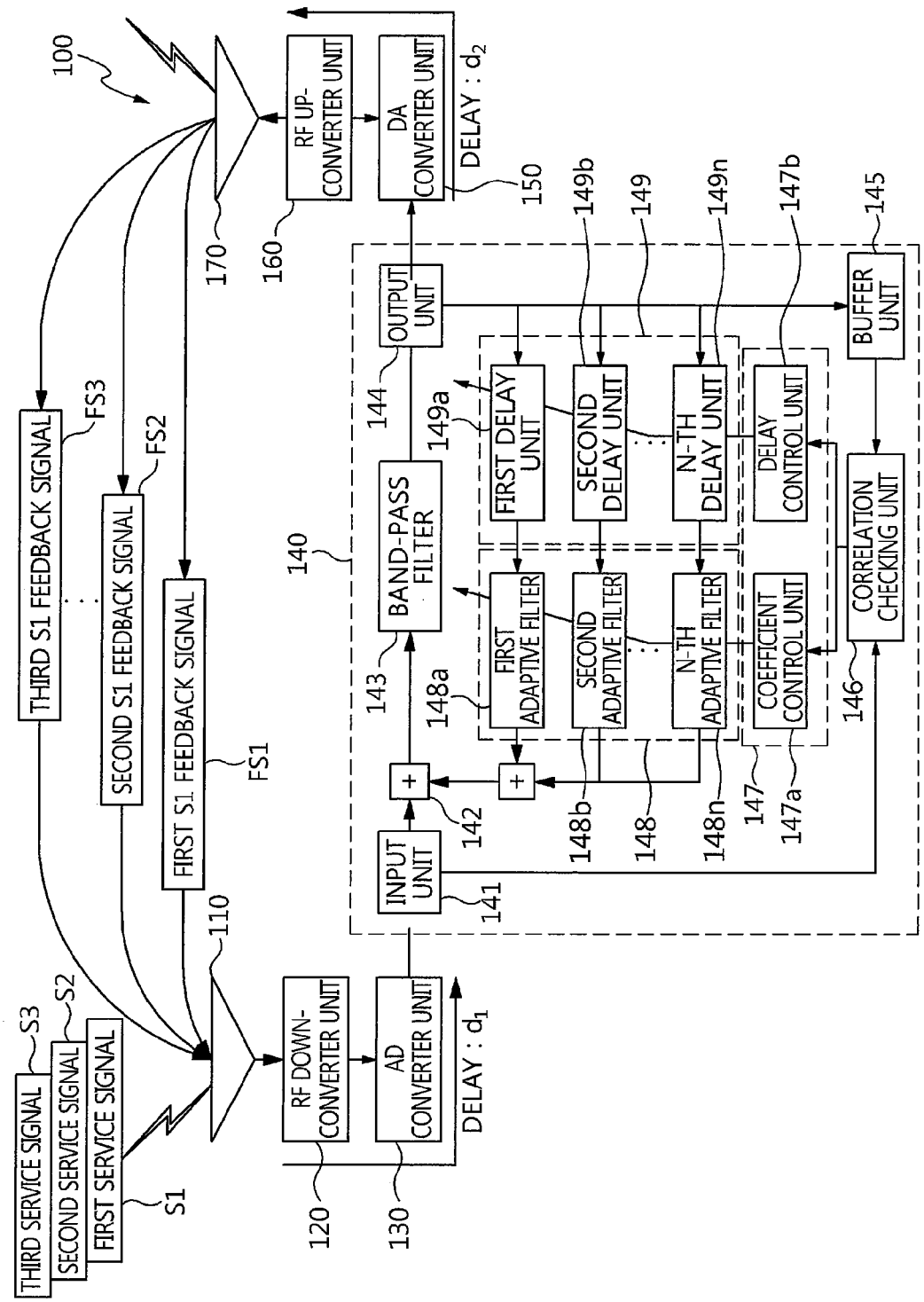
FIG. 1 is a block diagram illustrating the configuration of an interference cancellation repeater according to an embodiment of the present invention.

The present invention will be described in detail below with reference to the accompanying drawings. The present application incorporates by reference the entire content of Korean Patent Application No. 10-2013-0061372, filed with the Korean Intellectual Property Office on May 30, 2013. Repeated descriptions and descriptions of known functions and configurations which have been deemed to make the gist of the present invention unnecessarily vague will be omitted. The embodiments of the present invention are intended to fully describe the present invention to a person having ordinary knowledge in the art. Accordingly, the shapes, sizes, etc. of elements in the drawings may be exaggerated to make the description clear.

The configuration and operation of an interference cancellation repeater according to an embodiment of the present invention will be described below.

FIG. 1 is a block diagram illustrating the configuration of an interference cancellation repeater 100 according to an embodiment of the present invention.

Referring to FIG. 1, the interference cancellation repeater 100 according to this embodiment of the present invention may include a reception unit 110, an analog-to-digital (AD) converter unit 130, a digital processing unit 140, a digital-to-analog (DA) converter unit 150, and a transmission unit 170. The interference cancellation repeater 100 according to this embodiment of the present invention may further include a Radio Frequency (RF) down-converter unit 120, and an RF up-converter unit 160.

The reception unit 110 receives an analog signal from a base station or a terminal The RF down-converter unit 120 down-converts the analog signal, received from the reception unit 110, into an analog signal in an intermediate frequency band.

The AD converter unit 130 converts the analog signal, shifted to the intermediate frequency band by the RF down-converter unit 120, into a digital signal.

The digital processing unit 140 determines whether a feedback signal is present by analyzing the correlation between the digital signal output from the AD converter unit 130 and a previous transmission signal, and performs an operation of cancelling the feedback signal if the feedback signal is present. The previous transmission signal is an analog signal transmitted by the transmission unit 170 before the reception unit 110 receives the analog signal.

More particularly, the digital processing unit 140 may include an input unit 141, an interference cancellation unit 142, a band-pass filter 143, an output unit 144, a buffer unit 145, a correlation checking unit 146, a control unit 147, an adaptive filter unit 148, and a delay unit 149.

The input unit 141 receives the digital signal from the AD converter unit 130.

The interference cancellation unit 142 cancels the feedback signal from the digital signal received from the input unit 141. In this case, the interference cancellation unit 142 may cancel the feedback signal from the digital signal using the previous transmission signal that is filtered and output from the adaptive filter unit 148.

The band-pass filter 143 extracts a digital signal in a preset necessary band from the digital signal from which the feedback signal has been canceled by the interference cancellation unit 142. Although the band-pass filter 143 has been illustrated as being placed between the interference cancellation unit 142 and the output unit 144 in FIG. 1, it may be placed between the input unit 141 and the interference cancellation unit 142. That is, the band-pass filter 143 may extract a digital signal in a preset necessary band from the digital signal received from the input unit 141, and may transfer the extracted digital signal to the interference cancellation unit 142. In this case, the interference cancellation unit 142 cancels the feedback signal from the digital signal filtered by the band-pass filter 143.

The output unit 144 outputs the digital signal filtered by the band-pass filter 143 to the DA converter unit 150.

The buffer unit 145 stores the digital signal filtered by the band-pass filter 143 via the output unit 144. That is, the buffer unit 145 stores a signal identical to the digital signal transferred to the DA converter unit 150.

The correlation checking unit 146 determines whether the previous transmission signal stored in the buffer unit 145 is included in the digital signal received from the input unit 141 by analyzing the correlation between the digital signal and the previous transmission signal. In this case, the correlation checking unit 146 may periodically perform the correlation checking operation. Thereafter, if the similarity between a signal included in the digital signal and the previous transmission signal exceeds a predetermined reference value or a probability calculation value, the correlation checking unit 146 determines that the previous transmission signal is included in the digital signal as a feedback signal. The similarity between the signals included in the digital signal and the previous transmission signal may be calculated by the following Equation 1:

$$\frac{1}{L}\Sigma_{i=0}^{L-1} X_i Y_{i-k}, 0 < k < L \tag{1}$$

In Equation 1, $X_i$ is a current input signal, that is, the digital signal, and $Y_{i-k}$ is the previous transmission signal stored in the buffer unit 145. In this case, the previous transmission signal may be a signal input to the buffer unit 145 immediately before the previous transmission signal is output in the case of k=1, or a signal input to the buffer unit 145 immediately before k=1 in the case of k=2. Delay is controlled depending on the value of L, the maximum value of L is previously determined, and L has a value in the range from 2 to the maximum value.

Furthermore, the correlation checking unit 146 analyzes the correlation between the digital signal and a corresponding previous transmission signal only after a total delay time has elapsed from a point of time at which the previous transmission signal was stored in the buffer unit 145. The total delay time includes a first delay time d1 and a second delay time d2. The first delay time d1 is the time it takes for a signal received from the reception unit 110 to pass though the reception unit 110, the RF down-converter unit 120, and the AD converter unit 130. The second delay time d2 is the time it takes for a signal output from the output unit 144 to pass through the DA converter unit 150, the RF up-converter unit 160, and the transmission unit 170. That is, the correlation checking unit 146 does not analyze the correlation between a digital signal and a previous transmission signal in order to determine whether the previous transmission signal is included in the digital signal within a total delay time, that is, a minimum time it takes for the previous transmission signal to be output from the output unit 144 and then input to the input unit 141.

The control unit 147 may include a coefficient control unit 147a, and a delay control unit 147b. That is, if the correlation checking unit 146 determines that a feedback signal is included in a digital signal, the control unit 147 controls an operation of cancelling the feedback signal from the digital signal so that the operation is performed. That is, in order to cancel the feedback signal, the coefficient control unit 147a of the control unit 147 controls the filter coefficient of the adaptive filter unit 148, and the delay control unit 147b controls the delay time. The coefficient control unit 147a continuously updates the filter coefficient in order to cancel the feedback signal. In this case, the filter coefficient $W_k$ may be calculated by the following Equation 2:

$$W_k = W_{k-1} + 2 \times M \times E \times D \tag{2}$$

In Equation 2, $W_{k-1}$ is a filter coefficient applied to a previous transmission signal received before $W_k$, M is a predetermined fixed weight, E is a (k-1)-th output signal, that is, a signal immediately previously input to the buffer unit 145, and D is a delayed output signal.

The control unit 147 may select a specific adaptive filter and a specific delay unit from among a plurality of adaptive filters 148a, 148b, and 148n and a plurality of delay units 149a, 149b, 149n based on the correlation analyzed by the correlation checking unit 146, and may control the selected adaptive filter and delay unit so that a feedback signal is extracted.

The adaptive filter unit 148 filters a previous transmission signal to which a delay time has been applied by the delay unit 149, and outputs the filtered signal. The adaptive filter unit 148 may include a plurality of adaptive filters. That is, the adaptive filter unit 148 may include a first adaptive filter 148a, a second adaptive filter 148b, . . . , an n-th adaptive filter 148n. The control unit 147 may select an adaptive filter having an appropriate filter coefficient range from among the plurality of adaptive filters 148a, 148b, . . . , 148n.

Thereafter, the delay unit 149 applies a delay time to the previous transmission signal. The delay unit 149 may include a plurality of delay units. That is, the delay unit 149 may include a first delay unit 149a, a second delay unit 149b, . . . , an n-th delay unit 149n having different delay time ranges. The control unit 147 may apply a delay unit having an appropriate delay time selected from among the plurality of delay units 149a, 149b, and 149n to the previous transmission signal, and may transfer the resulting previous transmission signal to the adaptive filter unit 148.

The DA converter unit 150 converts the digital signal received from the digital processing unit 140 into a transmission analog signal.

The RF up-converter unit 160 up-converts the transmission analog signal received from the DA converter unit 150 into a transmission analog signal in an RF band.

The transmission unit 170 sends the transmission analog signal of the RF band output from the RF up-converter unit 160 to a terminal or a base station.

The flow of signals in the interference cancellation repeater 100 according to an embodiment of the present invention will be described below. First, first to third service signals S1 to S3 are signals that are sequentially input to the reception unit 110 over time.

First, the first service signal S1 is input to the reception unit 110. Thereafter, the first service signal S1 is transmitted by the transmission unit 170 via the RF down-converter unit 120, the AD converter unit 130, the digital processing unit 140, the DA converter unit 150, and the RF up-converter unit 160. In this case, the digital processing unit 140 stores the first service signal S1 in the buffer unit 145.

The first service signal S1 output from the transmission unit 170 may be fed back to the reception unit 110 depending on external environmental factors. The feedback signals of the first service signal S1 that are output from the transmission unit 170 and then input to the reception unit 110 are called a first S1 feedback signal FS1 to a third S1 feedback signal FS3 over time.

The first S1 feedback signal FS1 is combined with the second service signal S2 input to the reception unit 110, and is then input to the interference cancellation repeater 100.

The input signal (S2+FS1) is input to the digital processing unit 140 via the RF down-converter unit 120 and the AD converter unit 130. The correlation checking unit 146 analyzes the correlation between a signal (S2+FS1) input to the input unit 141 of the digital processing unit 140 and the first service signal S1 stored in the buffer unit 145. If it is determined that the feedback signal FS1 of the first service signal S1 is included in the signal (S2+FS1), the coefficient control unit 147a controls the filter coefficient of the adaptive filter unit 148 for cancelling the first S1 feedback signal FS1, and the delay control unit 147b controls the delay time of the delay unit 149. Accordingly, the interference cancellation unit 142 cancels the first S1 feedback signal FS1 from the signal (S2+FS1) input to the input unit 141, and transfers only the second service signal S2 to the band-pass filter 143 and the output unit 144. Thereafter, the second service signal S2 transferred to the output unit 144 is stored in the buffer unit 145 like the first service signal S1. The second service signal S2 that is output from the output unit 144 and then transmitted via the DA converter unit 150, the RF up-converter unit 160 and the transmission unit 170 may also be fed back to the reception unit 110 depending on external environmental factors.

When the third service signal S3 is input to the reception unit 110, a feedback signal may not be input to the reception unit 110. In such a case, the correlation checking unit 146 determines that a signal having a correlation with service signals stored in the buffer unit 145 is not included in the stored signals. Accordingly, the digital processing unit 140 filters the received third service signal S3, stores the filtered third service signal S3 in the buffer unit 145, and also outputs the filtered third service signal S3 to the DA converter unit 150 via the output unit 144 without performing any interference signal cancellation operation.

An interference cancellation repeating method according to an embodiment of the present invention will be described below.

Figure 2:
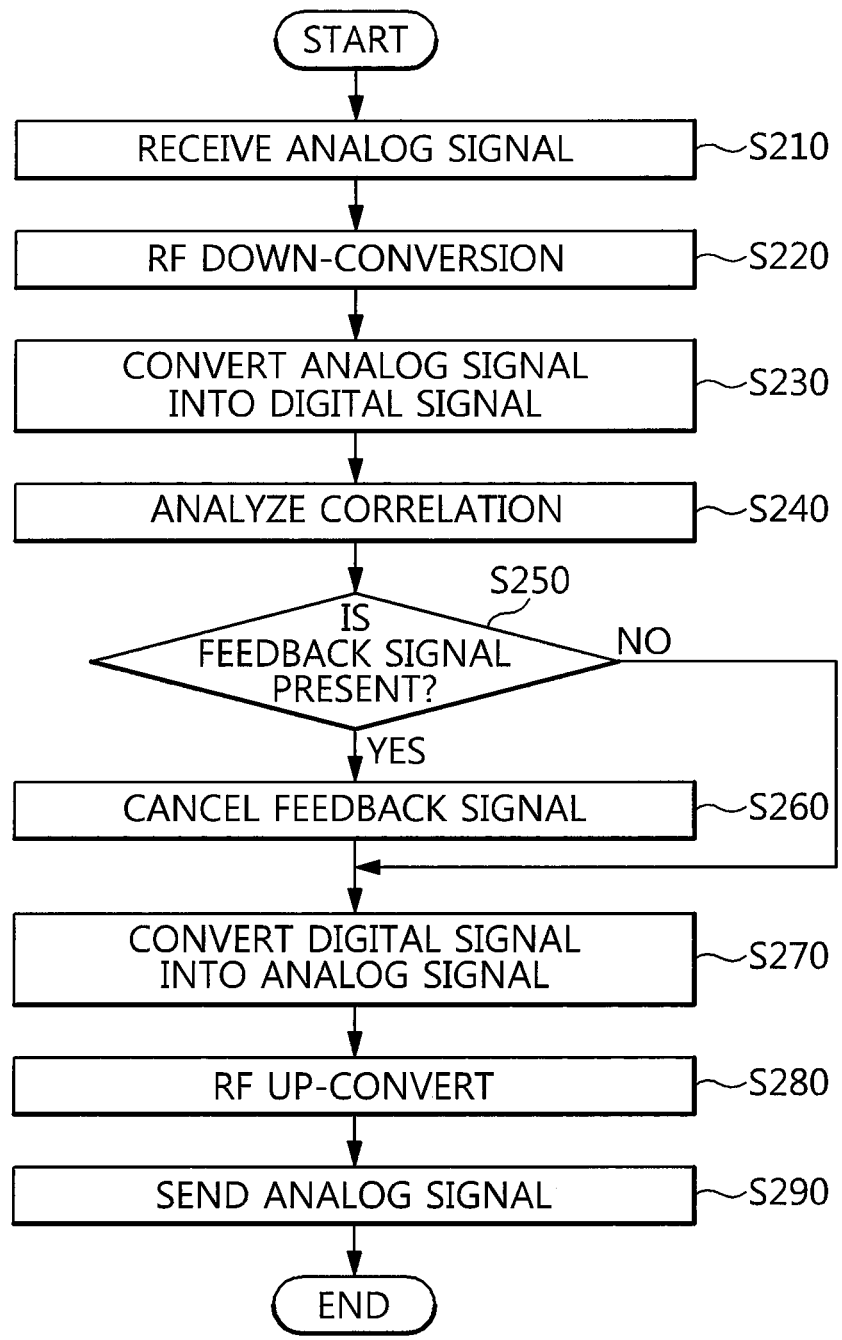
FIG. 2 is a flowchart illustrating an interference cancellation repeating method according to an embodiment of the present invention.

FIG. 2 is a flowchart illustrating the interference cancellation repeating method according to this embodiment of the present invention. The following interference cancellation repeating method may be performed using the hardware elements of the interference cancellation repeater that has been described with reference to FIG. 1.

Referring to FIG. 2, in the interference cancellation repeating method according to this embodiment of the present invention, first, the reception antenna of the interference cancellation repeater receives an analog signal at step S210.

The analog signal received at step S210 is shifted to an analog signal in an IF band. That is, the received analog signal is RF down-converted at step S220.

The RF down-converted analog signal is converted into a digital signal and then output at step S230.

The correlation between the digital signal output at step S230 and a previous transmission signal is analyzed at step S240.

Whether a signal having a high correlation with a feedback signal is included in the digital signal, that is, whether a feedback signal is present in the digital signal, is determined at step S250. In this case, whether a feedback signal is present may be periodically determined.

If, as a result of the determination S250, it is determined that the feedback signal is present in the digital signal, the feedback signal is cancelled from the digital signal at step S260. The digital signal from which the feedback signal has been cancelled is converted into an analog signal at step S270.

Since analyzing a correlation, determining whether a feedback signal is present, and cancelling the feedback signal that has been described at steps S240 to S260, has been described with reference to the digital processing unit 140 of FIG. 1, detailed descriptions thereof are omitted.

If, as a result of the determination at step S250, it is determined that the feedback signal is not present in the digital signal, the digital signal is filtered and then converted into an analog signal at step S270.

The analog signal output at step S270 is shifted to an analog signal in an RF band. That is, the output analog signal is RF up-converted at step S280.

The analog signal on which RF up-conversion has been performed is transmitted to a base station or a terminal via a transmission antenna at step S290.

The interference cancellation repeating method according to the present invention may be implemented in the form of program instructions and then stored in a computer-readable medium. The computer-readable medium may store the program instructions, data files, and data structures solely or in combination. The program instructions recorded on the medium may have been specially designed and implemented for the present invention, or may be known to those skilled in the computer software field and be used. Examples of the computer-readable medium include all types of hardware devices specially configured to store and execute the program instructions, such as magnetic media including a hard disk, a floppy disk, and a magnetic tape, optical media including Compact Disc (CD) ROM and Digital Video Disc (DVD) ROM, magneto-optical media including a floptical disk, Random Access Memory (RAM), and flash memory. Examples of the program instructions include machine code, such as one produced by a compiler, and high-level language code executable by computers using an interpreter. The hardware apparatus may be configured with one or more software modules for performing the operation of the present invention, and the vice versa.

The teaching of the principles of the present invention may be implemented by a combination of hardware and software. Furthermore, the software may be implemented as an application that is actually implemented on a program memory unit. The application may be uploaded to a machine including a specific architecture and executed by the machine. The machine preferably may be implemented on one or more Central Processing Units (CPUs), a computer processor, RAM, and a computer platform having hardware, such as input/output (I/O) interfaces. Furthermore, the computer platform may include an operating system and micro instruction code. A variety of the processes and functions may be some of the micro command code, some of the application, or a specific combination of them, which can be executed by various processing units including a CPU. In addition, a variety of other peripheral devices, such as an additional data memory unit and a printer, may be connected to the computer platform.

It is to be understood that actual connections between system components or process function blocks may be changed depending on a method of programming the principles of the present invention because some of the system components of the configuration and method described with reference to the accompanying drawings preferably are implemented in software. If the teaching is given, those skilled in the art may take the teaching of the principles of the present invention and similar implementation examples or configurations into consideration.

As described above, in accordance with the present invention, a feedback signal generated due to an insufficient distance between antennas is more precisely cancelled through digital signal processing, thereby preventing the oscillation of the mobile communication repeater.

Furthermore, interference cancellation repeating technology that requires a relatively small number of resources can be implemented because it is periodically checked based on the correlation between signals and the feedback signal whether a feedback signal is present and then the feedback signal is cancelled in real time.

Furthermore, interference cancellation repeating technology having no signal distortion can be implemented because an interference cancellation operation is not performed if a feedback signal is not present.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An interference cancellation repeater, comprising:
a reception unit configured to receive an analog signal;
an analog-to-digital (AD) converter unit configured to convert the received analog signal into a digital signal;
a digital processing unit configured to determine whether a feedback signal is present in the digital signal by analyzing a correlation between the digital signal and a previous transmission signal, and to perform an operation of cancelling the feedback signal with a control unit of the digital processing unit if, as a result of the determination, it is determined that the feedback signal is included in the digital signal, wherein the digital processing unit comprises an adaptive filter unit comprising a plurality of adaptive filters for performing the operation of cancelling the feedback signal;
a digital-to-analog (DA) converter unit configured to convert a signal output from the digital processing unit into a transmission analog signal; and
a transmission unit configured to send the transmission analog signal;
wherein the digital processing unit further comprises a buffer unit configured to store information about the previous transmission signal that is a signal transmitted by the transmission unit before the received analog signal.

2. The interference cancellation repeater of claim 1, wherein the digital processing unit further comprises:
an input unit configured to receive the digital signal from the AD converter unit;
a correlation checking unit configured to periodically check whether the previous transmission signal is included in the digital signal as the feedback signal by analyzing the correlation between the digital signal received from the input unit and the previous transmission signal stored in the buffer unit;
a delay unit configured to, under a control of the control unit, apply a specific delay time to the previous transmission signal, wherein the adaptive filter unit is configured to, under a control of the control unit, filter the previous transmission signal to which the specific delay time has been applied by the delay unit, output the filtered previous transmission signal, and update a coefficient of a filter in order to cancel the feedback signal; and
an interference cancellation unit configured to cancel the feedback signal from the digital signal using the previous transmission signal filtered and output by the adaptive filter unit.

3. The interference cancellation repeater of claim 2, wherein the correlation checking unit determines that the previous transmission signal is included in the digital signal as the feedback signal if a similarity between a signal included in the digital signal and the previous transmission signal exceeds a predetermined reference value or a probability calculation value.

4. The interference cancellation repeater of claim 2, wherein the delay unit comprises a plurality of delay units having different delay time ranges, and the control unit selects a specific adaptive filter and a specific delay unit from among the plurality of adaptive filters and the plurality of delay units based on the analyzed correlation, and extracts the feedback signal using the specific adaptive filter and the specific delay unit.

5. The interference cancellation repeater of claim 2, wherein:
the correlation checking unit does not analyze the correlation between the digital signal and the previous transmission signal from a point of time at which the previous transmission signal is stored in the buffer unit until a total delay time that is a sum of a first delay time it takes for a signal to pass through the reception unit and the AD converter unit, and a second delay time it takes for a signal to pass through the DA converter unit and the transmission unit elapses; and
the correlation checking unit analyzes the correlation between the digital signal and the previous transmission signal after the total delay time has elapsed from the point of time at which the previous transmission signal is stored in the buffer unit.

6. The interference cancellation repeater of claim 2, further comprising a band-pass filter configured to receive a digital signal from which the feedback signal has been canceled by the interference cancellation unit, and to extract a signal in a preset necessary band from the received digital signal.

7. The interference cancellation repeater of claim 2, further comprising a band-pass filter configured to receive the digital signal from the input unit, to extract a signal in a preset necessary band from the received digital signal, and to transfer the signal in the preset necessary band to the interference cancellation unit.

8. The interference cancellation repeater of claim 1, further comprising:
- an Radio Frequency (RF) down-converter unit configured to down-convert the received analog signal received from the reception unit into a signal in an intermediate frequency band; and
- an RF up-converter unit configured to up-convert the transmission analog signal received from the DA converter unit into a signal in an RF band.

9. The interference cancellation repeater of claim 1, wherein the digital processing unit further comprises a correlation checking unit configured to periodically check whether the previous transmission signal is included in the digital signal as the feedback signal by analyzing the correlation between the digital signal converted by the AD converter unit and the previous transmission signal.

10. The interference cancellation repeater of claim 1, wherein the digital processing unit further comprises a delay unit configured to, under a control of the control unit, apply a specific delay time to the previous transmission signal.

11. An interference cancellation repeating method, comprising:
- receiving, by a reception unit, an analog signal;
- converting, by an analog-to-digital (AD) converter unit, the received analog signal into a digital signal;
- determining, by a digital processing unit, whether a feedback signal is present in the digital signal by analyzing a correlation between the digital signal and a previous transmission signal, and performing, by a control unit of the digital processing unit, an operation of cancelling the feedback signal if, as a result of the determination, it is determined that the feedback signal is included in the digital signal, wherein the digital processing unit comprises an adaptive filter unit comprising a plurality of adaptive filters for performing the operation of cancelling the feedback signal;
- converting, by a digital-to-analog (DA) converter unit, a signal output from the digital processing unit into a transmission analog signal; and
- sending, by a transmission unit, the transmission analog signal;
- wherein a buffer unit of the digital processing unit stores information about the previous transmission signal that is a signal transmitted by the transmission unit before the received analog signal.

12. The interference cancellation repeating method of claim 11, wherein performing the operation of cancelling the feedback signal comprises:
- receiving, by an input unit, the digital signal from the AD converter unit;
- checking, by a correlation checking unit, whether the previous transmission signal stored in the buffer unit is included in the digital signal received from the input unit as the feedback signal by periodically analyzing a correlation between the digital signal and the previous transmission signal;
- applying, by a delay unit, a specific delay time to the previous transmission signal;
- filtering, by the adaptive filter unit having a coefficient updated in order to cancel a feedback signal, the previous transmission signal to which the specific delay time has been applied, and outputting, by an adaptive filter unit, the filtered previous transmission signal; and
- canceling, by an interference cancellation unit, the feedback signal from the digital signal using the filtered and output previous transmission signal.

13. The interference cancellation repeating method of claim 11, further comprising:
- down-converting, by an RF down-converter unit, the received analog signal received from the reception unit into a signal in an intermediate frequency band; and
- up-converting, by an RF up-converter unit, the transmission analog signal received from the DA converter unit into a signal in an RF band.

14. The interference cancellation repeating method of claim 12, wherein checking whether the previous transmission signal is included in the digital signal comprises:
- not analyzing the correlation between the digital signal and the previous transmission signal until a total delay time that is a sum of a first delay time it takes for a signal to pass through the reception unit and the AD converter unit and a second delay time it takes for a signal to pass through the DA converter unit and the transmission unit elapses; and
- analyzing the correlation between the digital signal and the previous transmission signal after the total delay time has elapsed from a point of time at which the previous transmission signal is stored in the buffer unit.

* * * * *